US012203455B2

United States Patent
Mitsuta et al.

(10) Patent No.: US 12,203,455 B2
(45) Date of Patent: Jan. 21, 2025

(54) ELECTROCHEMICAL COMPRESSOR

(71) Applicant: HONDA MOTOR CO., LTD., Tokyo (JP)

(72) Inventors: Naoki Mitsuta, Saitama (JP); Akihiro Noda, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 527 days.

(21) Appl. No.: 17/643,836

(22) Filed: Dec. 12, 2021

(65) Prior Publication Data
US 2022/0205431 A1 Jun. 30, 2022

(30) Foreign Application Priority Data
Dec. 25, 2020 (JP) .................................. 2020-216917

(51) Int. Cl.
*F03G 7/00* (2006.01)
*B01D 53/32* (2006.01)
(Continued)

(52) U.S. Cl.
CPC ......... *F03G 7/0254* (2021.08); *B01D 53/326* (2013.01); *C25B 1/02* (2013.01);
(Continued)

(58) Field of Classification Search
CPC .... C25B 1/02; C25B 1/04; C25B 9/00; C25B 9/05; C25B 9/07; C25B 9/17; C25B 9/19;
(Continued)

(56) References Cited

U.S. PATENT DOCUMENTS

| 5,716,503 A | * | 2/1998 | Dean ......................... C25B 9/01 |
| | | | 204/278 |
| 7,659,024 B2 | * | 2/2010 | Matsumoto ......... H01M 8/2483 |
| | | | 429/434 |

(Continued)

FOREIGN PATENT DOCUMENTS

| CN | 111082091 A | 4/2020 |
| JP | 2008121086 A | 5/2008 |

(Continued)

OTHER PUBLICATIONS

Han et al. "Study on the flooding phenomena and performance enhancement of PEM fuel cell applying a Concus-Finn condition" Renewable Energy 44 (2012) 88-98 (Year: 2012).*

(Continued)

*Primary Examiner* — Luan V Van
*Assistant Examiner* — Alexander R. Parent
(74) *Attorney, Agent, or Firm* — CKC & PARTNERS CO., LLC

(57) ABSTRACT

The present disclosure is intended to provide an electrochemical compressor capable of preventing a liquid, such as water, from accumulating inside a piston. An electrochemical compressor according to an embodiment includes a housing chamber and a drain path. The housing chamber houses an elastic body that presses an electrochemical cell with its elastic force, and is configured to receive part of a gas compressed by the electrochemical cell, the part of the gas flowing into the housing chamber. In the electrochemical cell, the gas is supplied to an anode side of a solid polymer electrolyte membrane as a partition wall, and is compressed
(Continued)

by being moved by electricity to a cathode side opposite to the anode side. The drain path allows a liquid in the housing chamber to be drained out of the housing chamber.

10 Claims, 6 Drawing Sheets

(51) Int. Cl.
    *C25B 1/02*         (2006.01)
    *C25B 9/05*         (2021.01)
    *C25B 9/07*         (2021.01)
    *C25B 9/77*         (2021.01)
    *C25B 1/04*         (2021.01)

(52) U.S. Cl.
    CPC ................ *C25B 9/05* (2021.01); *C25B 9/07* (2021.01); *C25B 9/77* (2021.01); *F03G 7/011* (2021.08); *F03G 7/012* (2021.08); *C25B 1/04* (2013.01)

(58) Field of Classification Search
    CPC .... C25B 9/23; C25B 9/30; C25B 9/60; C25B 9/70; C25B 9/73; C25B 9/75; C25B 9/77; F03G 7/0254; H01M 8/04156; H01M 8/04171; H01M 8/04432; H01M 8/04514; H01M 8/04522
    USPC ......................................................... 205/637
    See application file for complete search history.

(56) References Cited

U.S. PATENT DOCUMENTS

| | | | | |
|---|---|---|---|---|
| 7,879,207 | B2* | 2/2011 | Dalton | ................ H01M 8/2483 |
| | | | | 204/253 |
| 9,051,657 | B2* | 6/2015 | Karabin | .................... C25B 9/77 |
| 11,996,565 | B2* | 5/2024 | Kee | ............................ C25B 1/02 |
| 2006/0254907 | A1 | 11/2006 | Taruya et al. | |
| 2014/0014502 | A1 | 1/2014 | Karabin | |
| 2020/0124039 | A1* | 4/2020 | Ukai | ...................... H01M 8/248 |
| 2020/0350604 | A1* | 11/2020 | Ukai | ...................... C25B 11/056 |
| 2023/0227987 | A1* | 7/2023 | Kakuwa | .................... C25B 9/05 |
| | | | | 204/258 |
| 2023/0227990 | A1* | 7/2023 | Kita | ......................... C25B 15/08 |
| | | | | 204/295 |

FOREIGN PATENT DOCUMENTS

| | | |
|---|---|---|
| JP | 2013036068 A | 2/2013 |
| JP | 2015113497 A | 6/2015 |

OTHER PUBLICATIONS

Office Action issued Oct. 22, 2024 in the CN Patent Application No. 202111430686.4.

* cited by examiner

ELECTROCHEMICAL COMPRESSOR

This application is based on and claims the benefit of priority from Japanese Patent Application No. 2020-216917, filed on 25 Dec. 2020, the content of which is incorporated herein by reference.

BACKGROUND OF THE INVENTION

Field of the Invention

The present disclosure relates to an electrochemical compressor.

Related Art

Known examples of methods for increasing, i.e., boosting a pressure of a gas such as hydrogen include compressing the gas using a mechanical compressor and compressing the gas by electrochemically moving hydrogen through a solid polymer electrolyte membrane. A cell unit is used in the latter case. The cell unit electrically converts hydrogen supplied to the anode-side electrode into hydrogen ions. The hydrogen ions move through the solid polymer electrolyte membrane, and then, combine with electrons at the cathode-side electrode, whereby the hydrogen ions are converted into hydrogen. In other words, electricity moves hydrogen from one surface to the opposite surface of the solid polymer electrolyte membrane. When the side to which hydrogen has been moved is directly connected to, for example, a tank, the gas has nowhere to go and is compressed to a high-pressure gas. To increase an amount of the gas to move, i.e., to increase a pressure rise rate, a plurality of such cell units are stacked.

During a process using the stack of cell units described above, the cell units are likely to open due to the pressure increased by the cell units themselves. Therefore, a pressing force is applied in the stacking direction to overcome the increased pressure, so that stable electrolysis performance can be achieved. In general, it is necessary to clamp the cell units with a force greater than the high pressure generated by the cells themselves. Meanwhile, there is a known piston structure for use in a differential pressure-type water electrolysis apparatus. The piston structure generates and transmits a pressure in a direction in which cell units are pressed. The piston presses the cell units by means of an elastic force exerted by a Belleville spring or the like and a pressure of a high-pressure hydrogen gas generated by the cell units. Therefore, even when a high-pressure gas is to be produced, it is unnecessary to hold the stack of cell units under a high load greater than the pressure of the high-pressure gas, whereby breakage of the components of the water electrolysis apparatus can be inhibited.

Patent Document 1: Japanese Unexamined Patent Application, Publication No. 201.5-113497

SUMMARY OF THE INVENTION

However, the piston disclosed in Patent Document 1, which includes, in its interior, paths and spaces where a high-pressure gas flows and a Belleville spring that generates an elastic force, involves a problem: water accumulates in a recess and other areas in the space where the Belleville spring is housed. The water accumulating in the recess and other areas results from, for example, condensation of moisture contained in the high-pressure gas. The water causes a problem of corrosion of the Belleville spring and other components. Corrosion of an elastic body such as the Belleville spring reduces the elastic force of the elastic body and causes an uneven load to be applied to the cell units, resulting in a decrease in the reaction efficiency of the cell units in some cases. Such a decrease in the reaction efficiency of the cell units means a decrease in the product performance.

The present disclosure is intended to provide an electrochemical compressor capable of preventing a liquid, such as water, from accumulating inside a piston.

An electrochemical compressor according to an embodiment includes a housing chamber and a drain path. The housing chamber houses an elastic body that presses an electrochemical cell with its elastic force, and is configured to receive part of a gas compressed by the electrochemical cell, the part of the gas flowing into the housing chamber. In the electrochemical cell, the gas is supplied to an anode side of a solid polymer electrolyte membrane as a partition wall, and is compressed by being moved by electricity to a cathode side opposite to the anode side. The drain path allows a liquid in the housing chamber to be drained out of the housing chamber.

The present disclosure can prevent accumulation of water inside the piston.

DETAILED DESCRIPTION OF THE INVENTION

Figure 1:
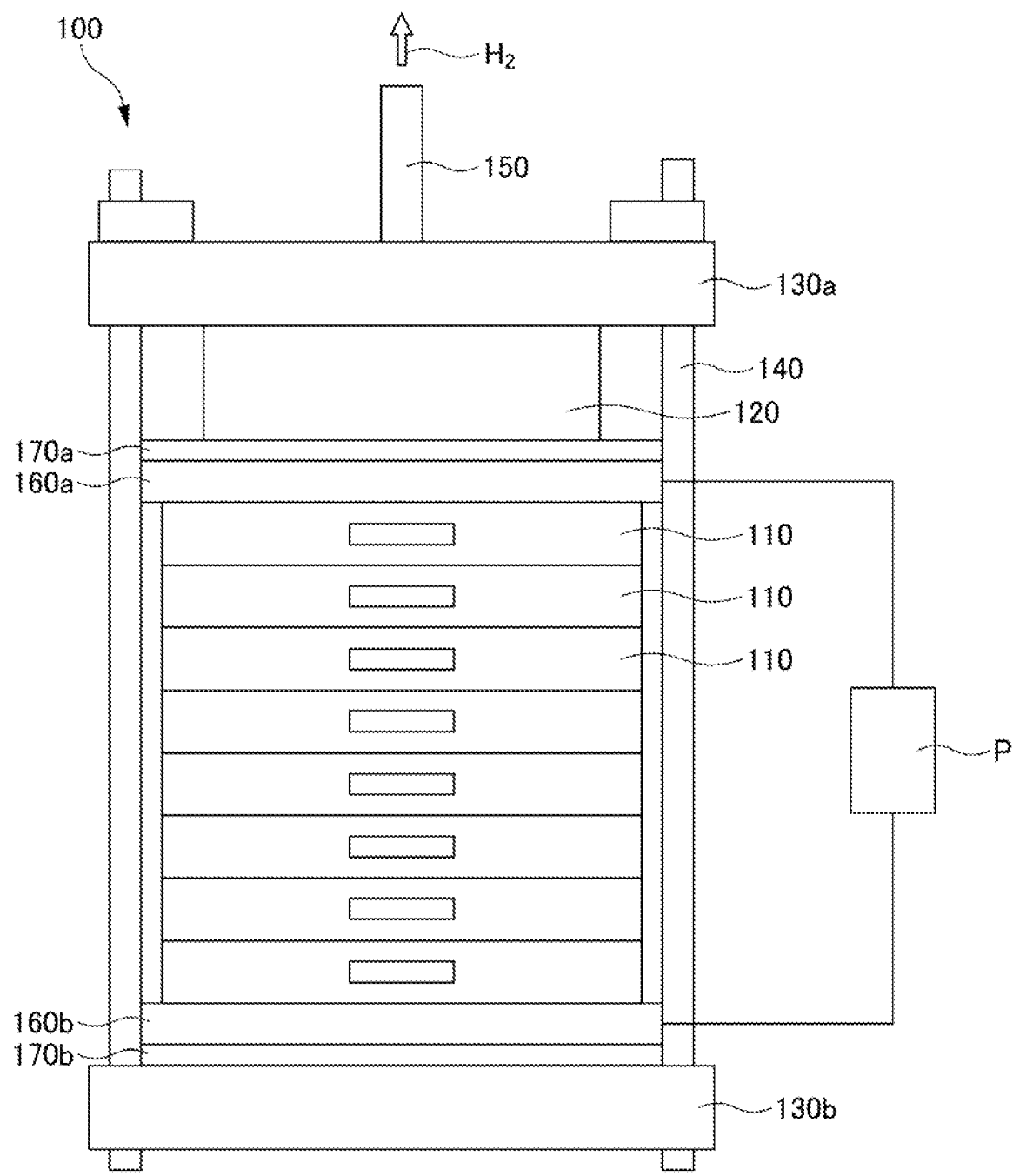
FIG. 1 is a side view illustrating, as an example, the appearance of an electrochemical hydrogen compressor according to an embodiment.

An electrochemical hydrogen compressor according to an embodiment will be described below with reference to the drawings. The drawings to which reference will be made in the following description of the embodiment may illustrate components on an appropriately modified scale. In the drawings to which reference will be made in the following description of the embodiment, a portion of a configuration may be omitted or illustrated in a simplified manner, for the sake of convenience. In the drawings and the present specification, the same reference character denotes the same or similar element. FIG. 1 is a side view illustrating, as an example, the appearance of an electrochemical hydrogen compressor 100 according to the embodiment.

The electrochemical hydrogen compressor 100 is an apparatus configured to increase a pressure of hydrogen. The electrochemical hydrogen compressor 100 includes, for example, a plurality of cell units 110, a piston unit 120, a top plate 130a, a bottom plate 130b, a tie rod 140, a high-pressure hydrogen outlet 150, two end plates 160, and two insulation plates 170. The electrochemical hydrogen compressor 100 is an example of an electrochemical compressor.

The cell units 110, the piston unit 120, the top plate 130a, and the bottom plate 130b illustrated in FIG. 1 each have a substantially circular column shape, but may have another shape such as a prism shape. The bottom plate 130b, the plurality of cell units 110, the piston unit 120, and the top plate 130a are stacked in this order.

Each of the cell units 110 electrochemically moves hydrogen from one side to an opposite side of an electrolyte membrane. The hydrogen moved in the cell unit 110 is compressed to reach a high pressure of, for example, about 1 MPa to about 90 MPa. The cell unit 110 is similarly configured when it is applied to a fluid production apparatus using water electrolysis or a pressurization apparatus using water electrolysis. The cell unit 110 will be described in more detail later. The cell unit 110 is an example of an electrochemical cell.

The piston unit 120 presses the cell units 110. The piston unit 120 has, for example, a circular column shape. The piston unit 120 will be described in more detail later.

The top plate 130a and the bottom plate 130b are members having a circular column shape and are disposed to sandwich the cell units 110 and the piston unit 120 therebetween. In the following description of the embodiment, the side adjacent to the top plate 130a is defined as the top side of the electrochemical hydrogen compressor 100. The side adjacent to the bottom plate 130b is defined as the bottom side of the electrochemical hydrogen compressor 100.

The tie rod 140 holds the bottom plate 130b, the plurality of cell units 110, the piston unit 120, and the top plate 130a by clamping and tightening them.

The high-pressure hydrogen outlet 150 is a pipe for guiding hydrogen compressed by the electrochemical hydrogen compressor 100 to a hydrogen tank or the like provided outside the electrochemical hydrogen compressor 100.

The electrochemical hydrogen compressor 100 is provided with the two end plates 160 including an end plate 160a and an end plate 160b. The end plate 160a and the end plate 160b sandwich therebetween the plurality of cell units 110 in the vertical direction. The end plates 160 are provided with terminals for connection to an external power supply P. The end plates 160 each have one surface in contact with the stack of cell units 110 sandwiched therebetween, and the opposite surface on which a corresponding one of the insulation plates 170 is disposed. This configuration prevents leakage of electricity to the outside. The insulation plates 170 may be provided in the form of a paint or a film as long as they have insulating properties.

The electrochemical hydrogen compressor 100 is provided with the two insulation plates 170 including an insulation plate 170a and an insulation plate 170b. The insulation plate 170a and the insulation plate 170b are disposed to sandwich therebetween the plurality of cell units 110 and the two end plates 160 in the vertical direction. The insulation plates 170 are each disposed in contact with a corresponding one of the end plates 160, so that leakage of electricity to the outside of the end plates 160 is prevented. Each insulation plate 170 is, for example, a circular insulating plate. Alternatively, each insulation plate 170 may be provided as an insulating film or an insulating paint.

Figure 2:
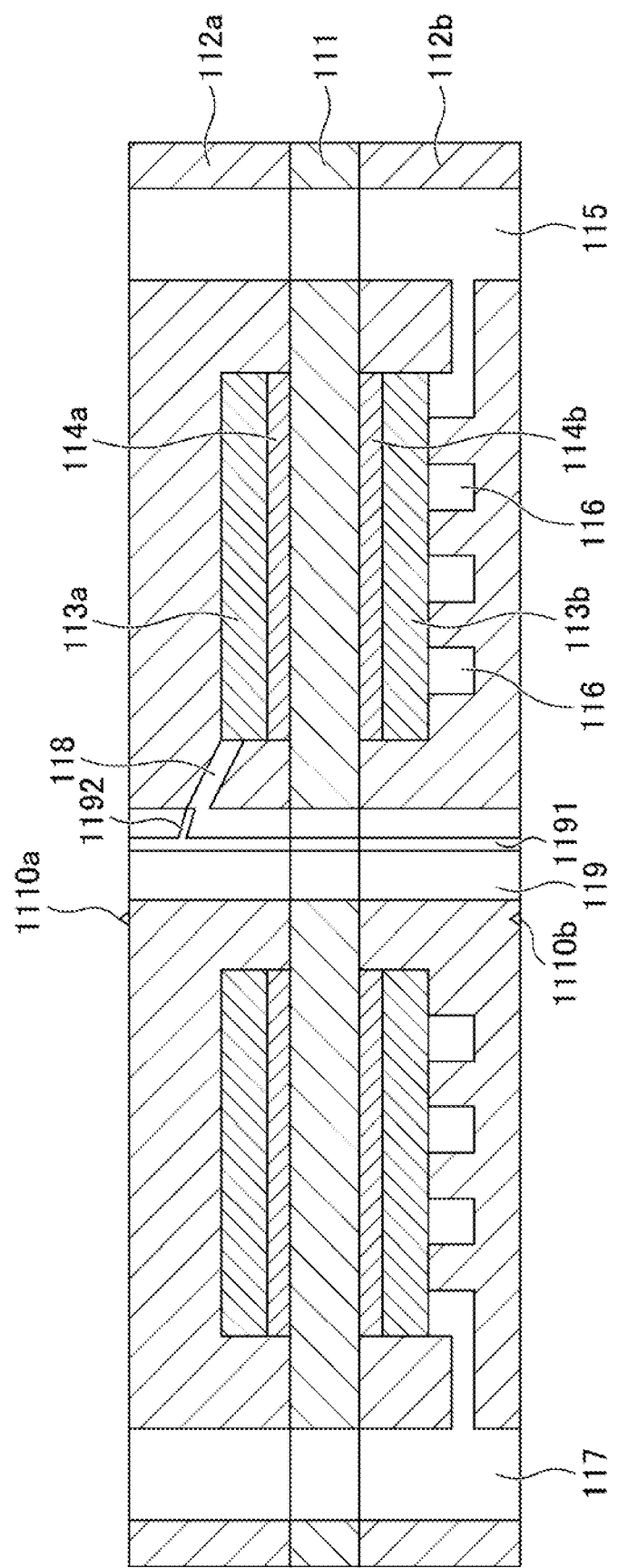
FIG. 2 is an axial cross-sectional view illustrating the cell unit in FIG. 1, as an example.

The cell unit 110 will be described in more detail with reference to FIG. 2. FIG. 2 is an axial cross-sectional view illustrating the cell unit 110 as an example. The cell unit 110 includes, for example, an electrolyte membrane 111, a cathode-side separator 112a, an anode-side separator 112b, a cathode-side power feeder 113a, an anode-side power feeder 113b, a cathode-side catalyst 114a, an anode-side catalyst 114b, a normal-pressure hydrogen supply path 115, a normal-pressure hydrogen flow path 116, a normal-pressure hydrogen discharge path 117, a high-pressure hydrogen discharge path 118, a high-pressure hydrogen flow path 119, and marks 1110.

The electrolyte membrane 111 is, for example, a cation-exchange type, solid polymer electrolyte membrane including a perfluorosulfonic acid polymer. The electrolyte membrane 111 has, for example, a circular shape.

The cathode-side separator 112a and the anode-side separator 112b are stacked with the electrolyte membrane 111 sandwiched therebetween. The cathode-side separator 112a and the anode-side separator 112b are each constituted by, for example, a carbon member. Alternatively, each of the cathode-side separator 112a and the anode-side separator 112b may be a steel plate, a stainless-steel plate, a titanium plate, an aluminum plate, a plated steel plate, or a metal plate having a metal surface subjected to anti-corrosive surface treatment. The cathode-side separator 112a and the anode-side separator 112b have, for example, a circular column shape. For example, the cathode-side separator 112a is stacked on top of the electrolyte membrane 111. The anode-side separator 112b is disposed opposite to the cathode side and stacked below the electrolyte membrane 111.

The cathode-side power feeder 113a and the anode-side power feeder 113b are each constituted by, for example, a sintered compact of spherical atomized titanium powder (porous conductor). For example, each of the cathode-side power feeder 113a and the anode-side power feeder 113b includes a smooth surface portion etched after a grinding process, and has a porosity within the range from 10% to 46%, more preferably, from 20% to 40%. The cathode-side power feeder 113a and the anode-side power feeder 113b have, for example, a ring shape (hollow cylindrical shape). The cathode-side power feeder 113a is provided between the cathode-side separator 112a and the electrolyte membrane 111. The anode-side power feeder 113b is provided between the anode-side separator 112b and the electrolyte membrane 111.

The cathode-side catalyst 114a is provided on a surface of the electrolyte membrane 111, the surface being between the cathode-side power feeder 113a and the electrolyte membrane 111. The cathode-side catalyst 114a is, for example, a platinum catalyst. The anode-side catalyst 114b is provided on a surface of the electrolyte membrane 111, the surface being between the anode-side power feeder 113b and the electrolyte membrane 111. The anode-side catalyst 114b is, for example, a platinum-based catalyst or a ruthenium-based catalyst. The cathode-side catalyst 114a and the anode-side catalyst 114b have, for example, a ring shape.

The normal-pressure hydrogen supply path 115 is a hole passing through the electrolyte membrane 111, the cathode-side separator 112a, and the anode-side separator 112b. The normal-pressure hydrogen supply path 115 is a channel through which normal-pressure hydrogen to be compressed is supplied to the cell unit 110. The normal-pressure hydrogen is humidified by, for example, a humidifier, and passes through the normal-pressure hydrogen supply path 115 together with water vapor. This humidification is for moistening the electrolyte membrane 111, as it is preferable for the electrolyte membrane 111 to be moistened. The normal-pressure hydrogen flow path 116 is in communication with the normal-pressure hydrogen supply path 115. The normal-pressure hydrogen flow path 116 allows the normal-pressure hydrogen to be supplied along the anode-side power feeder 113b. The normal-pressure hydrogen flowing through the normal-pressure hydrogen flow path 116 is converted into hydrogen ions and electrons by electricity at the anode-side catalyst 114b. The hydrogen ions produced by way of this reaction move to the cathode-side catalyst 114a through the electrolyte membrane 111 and combine with electrons to be converted into hydrogen. The resulting hydrogen flows through a high-pressure hydrogen flow path in the cathode-side power feeder 113a.

The normal-pressure hydrogen discharge path 117 is a hole passing through the electrolyte membrane 111, the cathode-side separator 112a, and the anode-side separator 112b. The normal-pressure hydrogen discharge path 117 is a channel into which an unreacted portion of the normal-pressure hydrogen supplied in the above-described manner is discharged, the unreacted portion remaining to be converted into hydrogen ions and electrons. For example, the unreacted portion of the normal-pressure hydrogen is recirculated through the system to be supplied to the cell units 110.

The high-pressure hydrogen discharge path 118 is a channel through which the high-pressure hydrogen generated in the above-described manner is discharged into the high-pressure hydrogen flow path 119. The high-pressure hydrogen flow path 119 is a hole passing through the electrolyte membrane 111, the cathode-side separator 112a, and the anode-side separator 112b. The high-pressure hydrogen flow path 119 is a channel through which the hydrogen compressed by the cell unit 110 is conveyed to the piston unit 120 and the high-pressure hydrogen outlet 150. The high-pressure hydrogen flow path 119 has, on its wall surface, a liquid guide groove 1191 and a liquid guide groove 1192. The liquid guide groove 1191 and the liquid guide groove 1192 will be described later.

The marks 1110 are alignment marks with reference to which phases (positions) of the plurality of cell units 110 are aligned with each other. When the phases of the plurality of cell units 110 are in alignment with each other, the liquid guide grooves 1191 of the plurality of cell units 110 are connected to, and in alignment with, each other. If at least one cell unit 110 is out of phase alignment, i.e., has rotated from the position where it is in phase alignment, the liquid guide grooves 1191 are misaligned from or not connected to each other between the cell units 110. Each mark 1110 may be a planar mark or a three-dimensional mark such as a protrusion. FIG. 2 illustrates the two marks: a mark 1110a and a mark 1110b. The mark 1110a is a mark in the form of a protrusion. The marker 1110b is a mark in the form of a hole. When two cell units 110 are to be stacked on each other, the mark 1110a of the lower cell unit 110 is fitted into the mark 1110b of the upper cell unit 110, whereby the two stacked cell units 110 are brought into phase alignment. The marks 1110 can also be used to cause the high-pressure hydrogen discharge paths 118 to extend in different directions. In a state where the cells units are in phase alignment, the high-pressure hydrogen discharge paths 118 extend in respective proper directions.

Figure 3:
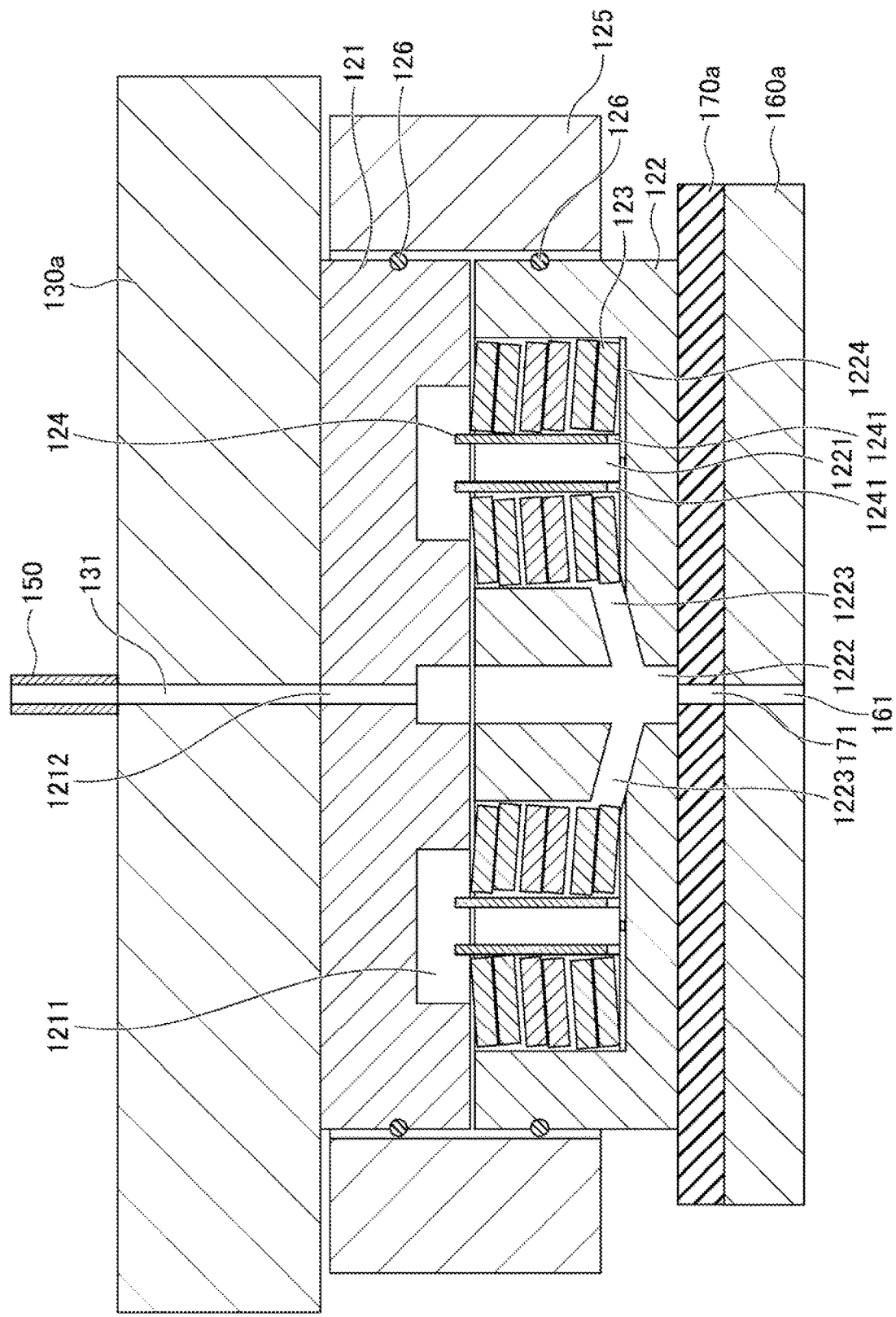
FIG. 3 is an axial cross-sectional view illustrating, the piston unit in FIG. 1, as an example.

The piston unit 120 will be described in detail with reference to FIG. 3. FIG. 3 is an axial cross-sectional view illustrating the piston unit 120 as an example. The piston unit 120 includes, for example, a stationary member 121, a movable member 122, Belleville springs 123, spring shafts 124, a ring member 125, and sealing members 126. The piston unit 120 may be provided with, on a surface of the movable member 122 facing the end plate 160a, an insulating layer, such as an insulating material or insulating coating, instead of the insulation plate 170a. Alternatively, to further enhance insulating property, the piston unit 120 may be provided with an insulating layer, such as an insulating material or insulating coating, in addition to the insulation plate 170a.

The stationary member 121 is disposed between the top plate 130a and the movable member 122. The stationary member 121 is fixed to the top plate 130a. The bottom surface of the stationary member 121 is in contact with the upper surfaces of the Belleville springs 123. A gap is provided between the stationary member 121 and the movable member 122. The stationary member 121 includes, for example, recesses 1211 and a high-pressure hydrogen flow path 1212.

Each recess 1211 is a cylindrical recess. The stationary member 121 has the plurality of recesses 1211 arranged at equal intervals on a circumference. In other words, on the movable members 122, axes of the recesses 1211 are spaced apart from each other by the same angle on the same circumference. The stationary member 121 as an example has four recesses 1211. Accordingly, the axes of the adjacent recesses 1211 form an angle of 90 degrees. The number of the recesses 1211 may be less or more than four.

The high-pressure hydrogen flow path 1212 is a hole through which the high-pressure hydrogen generated by the cell units 110 passes. The high-pressure hydrogen flow path 1212 is in communication with the high-pressure hydrogen flow path 1222 and a high-pressure hydrogen flow path 131.

The movable member 122 is disposed between the stationary member 121 and the insulation plate 170a. The top surface of the movable member 122 faces the bottom surface of the stationary member 121. The movable member 122 is movable in the vertical direction. The movable member 122 includes, for example, spring recesses 1221, the high-pressure hydrogen flow path 1222, liquid drain paths 1223, and liquid drain grooves 1224. The movable member 122 is an example of a second member.

The spring recesses 1221 are cylindrical recesses in which the Belleville springs 123 are fitted. The number of the spring recesses 1221 is the same as the number of the recesses 1211. Therefore, in the present embodiment, four spring recesses 1221 are provided. Each spring recess 1221 faces a corresponding one of the recesses 1211, and their axes coincide with each other. Each spring recess 1221 and the corresponding recess 1211 facing each other are in communication with each other. Each recess 1211 and the corresponding spring recess 1221 facing each other form a hydrogen chamber. Part of hydrogen in the high-pressure hydrogen flow path 1212 and the high-pressure hydrogen flow path 1222 flows into each hydrogen chamber. The part of hydrogen flowing into each hydrogen chamber contains moisture. When this moisture condensates due to a decrease in temperature or pressure in the hydrogen chamber, it turns into water in liquid form. Note that the gap between the stationary member 121 and the movable member 122 connects all the recesses 1211, all the spring recess 1221, the high-pressure hydrogen flow path 1212, and the high-pressure hydrogen flow path 1222 to one another. Accordingly, the pressure of hydrogen in the hydrogen chambers is approximately equal to the pressure in the high-pressure hydrogen flow path 1212 and the pressure in the high-pressure hydrogen flow path 1222, so that the pressure of hydrogen in the hydrogen chambers applies a force in a direction in which the stationary member 121 and the movable member 122 are pushed apart from each other by the Belleville springs 123. The spring recess 1221 is an example of a housing chamber for housing the Belleville spring 123.

The high-pressure hydrogen flow path 1222 is a cylindrical hole through which the high-pressure hydrogen generated by the cell units 110 passes. The high-pressure hydrogen flow path 1222 is in communication with the high-pressure hydrogen flow path 1212 and a high-pressure hydrogen flow path 171.

Each liquid drain path 1223 is, for example, a hole in communication with the spring recess 1221 and the high-pressure hydrogen flow path 1222. For example, the liquid drain paths 1223 and the spring recesses 1221 are provided on a one-to-one basis. Water in the hydrogen chamber, such as water generated in the hydrogen chamber, is drained out of the hydrogen chamber through the liquid drain path 1223. The water that has entered the liquid drain path 1223 passes through the liquid drain path 1223 to be drained into the high-pressure hydrogen flow path 1222. The water drained into the high-pressure hydrogen flow path 1222 passes through the high-pressure hydrogen flow path 171 and a high-pressure hydrogen flow path 161 to enter the high-pressure hydrogen flow paths 119. The liquid drain path 1223 is an example of a drain path that allows water in the spring recess 1221 to be drained out of the spring recess 1221.

The liquid drain groove 1224 is a groove formed on the bottom of the spring recess 1221. The liquid drain groove 1224 is connected to the liquid drain path 1223. The liquid drain groove 1224 makes it easy for water in the spring recess 1221 to flow into the liquid drain path 1223. The water that has entered the liquid drain groove 1224 flows into the liquid drain path 1223. The liquid drain groove 1224 is an example of a drain groove.

Reference is made back to FIG. 3. Each of the Belleville springs 123 is a disc spring sandwiched between the bottom surface of the spring recess 1221 of the movable member 122 and the bottom surface of the stationary member 121. The Belleville springs 123 press, with their elastic force, the bottom surfaces of the spring recesses 1221 and the bottom surface of the stationary member 121. Thus, the Belleville springs 123 exert their elastic force in the direction in which the stationary member 121 and the movable member 122 are pushed apart from each other. Since the stationary member 121 is fixed, the Belleville springs 123 press the movable member 122 downward with their elastic force. Each Belleville spring 123 illustrated in FIG. 3 has a hole in its central portion. Each Belleville spring 123 is prevented from moving in the horizontal direction by the side surface of the spring recess 1221 and the spring shaft 124. The piston unit 120 is configured such that the movable member 122 is pressed downward by the elastic force of the Belleville springs 123 and the pressure of hydrogen in the hydrogen chambers.

Each spring shaft 124 is fixed to the center of the bottom of the corresponding spring recess 1221. The piston unit 120 includes the spring shafts 124 and the spring recesses 1221 on a one-to-one basis. The spring shaft 124 is a hollow cylindrical member penetrating, for example, the hole formed at the center of the Belleville spring 123. Thus, the Belleville spring 123 is fitted on the spring shaft 124. The spring shafts 124 illustrated in FIG. 3 are hollow, but they do not have to be hollow. The spring shafts 124 are an example of a rod-shaped hollow shaft that is fittable in the hole of the Belleville spring 123.

The spring shaft 124 preferably has at least one liquid drain hole 1241 penetrating the side of the spring shaft 124. The liquid drain hole 1241 is for draining water present in the interior (hollow portion) of the spring shaft 124 to the outside of the spring shaft 124. It is preferable that the liquid drain hole 1241 is partially defined by the bottom of the spring recess 1221. The configuration in which liquid drain hole 1241 is partially defined by the bottom of the spring recess 1221 facilitates drainage of water out of the spring shaft 124. The liquid drain hole 1241 is an example of a drain hole.

The ring member 125 is a ring-shaped member provided to surround the stationary member 121 and the movable member 122.

The piston unit 120 is provided with the two sealing members including, for example, a sealing member 126a and a sealing member 126b. The sealing member 126a is, for example, an O-ring provided to surround the stationary member 121. The sealing member 126b is, for example, an O-ring provided to surround the movable member 122. The sealing members 126 provide sealing for preventing hydrogen that has passed through the gap between the stationary member 121 and the movable member 122 from leaking out beyond the sealing members 126.

As illustrated in FIG. 3, the top plate 130a has the high-pressure hydrogen flow path 131. The high-pressure hydrogen flow path 131 is a hole through which the hydrogen compressed by the cell units 110 passes. The high-pressure hydrogen flow path 131 is in communication with the high-pressure hydrogen outlet 150 and the high-pressure hydrogen flow path 1212.

The end plate 160a has the high-pressure hydrogen flow path 161. The high-pressure hydrogen flow path 161 is a cylindrical hole through which the high-pressure hydrogen generated by the cell units 110 passes. The high-pressure hydrogen flow path 161 is in communication with the high-pressure hydrogen flow path 171 and the high-pressure hydrogen flow path 119. The insulation plate 170a has the high-pressure hydrogen flow path 171. The high-pressure hydrogen flow path 171 is a cylindrical hole through which the high-pressure hydrogen generated by the cell units 110 passes. The high-pressure hydrogen flow path 171 is in communication with the high-pressure hydrogen flow path 1222 and the high-pressure hydrogen flow path 161.

Figure 4:
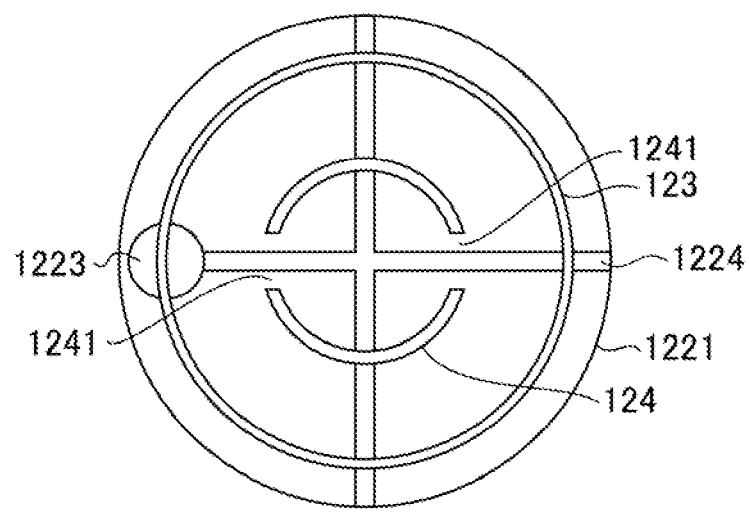
FIG. 4 is a diagram illustrating, as an example, a bottom surface of a spring recess illustrated in FIG. 3.

The liquid drain path 1223 and the liquid drain groove 1224 will be further described with reference to FIG. 4. FIG. 4 is a diagram illustrating the bottom surface of the spring recess 1221, as an example. Note that FIG. 4 illustrates only the bottom surface of a bottom Belleville spring 123 included in the Belleville spring 123 (hereinafter referred to as the "spring bottom"). The spring bottom is in contact with the bottom surface of the spring recess 1221.

In FIG. 4, the inlet of the liquid drain path 1223 is illustrated and denoted by the reference numeral 1223. The inlet of the liquid drain path 1223 as an example is formed astride the spring bottom. The inlet formed in this manner causes water present both inside (one side) and outside (the other side) the spring bottom in the spring recess 1221 to flow into the liquid drain path 1223. This configuration eliminates the need to provide two or more liquid drain paths to one spring recess 1221. The inlet of the liquid drain path 1223 may be formed across the side and the bottom of the spring recess 1221 as illustrated in FIG. 3, or may be formed at the bottom of the spring recess 1221 as illustrated in FIG. 4. Alternatively, the inlet of the liquid drain path 1223 may be formed at the side of the spring recess 1221.

As illustrated in FIG. 4, the liquid drain groove 1224 is, for example, a cross-shaped groove formed on the bottom surface of the spring recess 1221. However, the liquid drain groove 1224 may have a shape other than the cross shape. The liquid drain groove 1224 as an example is formed astride the spring bottom. Forming the liquid drain groove 1224 in this shape makes it easy for water present both inside and outside the spring bottom in the spring recess 1221 to flow into the liquid drain groove 1224. The liquid drain groove 1224 as an example is formed astride the bottom of the side wall of the spring shaft 124. Forming the liquid drain groove 1224 in this shape makes it easy for water present both inside and outside the spring shaft 124 to flow into the liquid drain groove 1224. Provision of the liquid drain groove 1224 allows water present both inside and outside the spring bottom in the spring recess 1221 to flow through the liquid drain groove 1224 into the liquid drain path 1223 even if the inlet of the liquid drain path 1223 is not formed astride the spring bottom.

Figure 5:
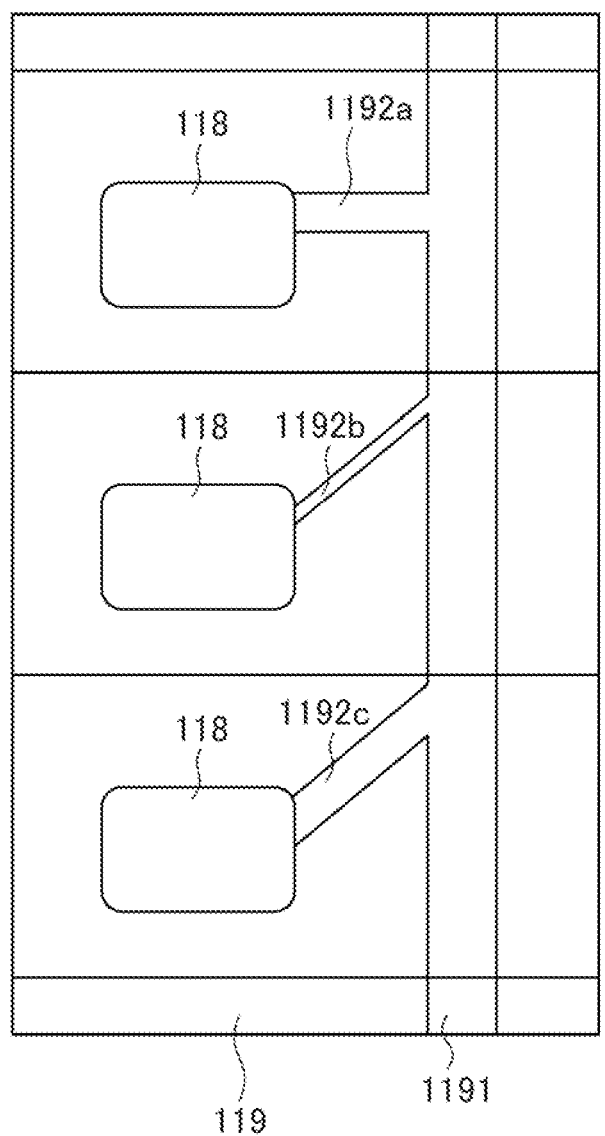
FIG. 5 is a diagram illustrating, as an example, a wall surface of a high-pressure hydrogen flow path illustrated in FIG. 2.

The liquid guide grooves 1191 and the liquid guide grooves 1192 will now be described with reference to FIG. 5. FIG. 5 is a diagram illustrating wall surfaces of the high-pressure hydrogen flow paths 119, as an example. FIG. 5 illustrates the high-pressure hydrogen flow paths 119 of three staked cell units 110.

As described earlier, the liquid guide groove 1191 and the liquid guide groove 1192 are formed on the wall surface of the high-pressure hydrogen flow path 119. The liquid guide grooves 1191 constitute one groove that is continuous from the lowermost cell unit 110 to the uppermost cell unit 110. The liquid guide grooves 1191 may constitute one groove reaching to the end plate 160a, the insulation plate 170a, and the piston unit 120. The lowermost portion of the liquid guide grooves 1191 is connected to, for example, a drain path for draining water out of the electrochemical hydrogen compressor 100. The liquid guide grooves 1191 are for guiding the flow of water drained through the liquid drain paths 1223. Part or all of the water drained through the liquid drain paths 1223 flows down along the liquid guide grooves 1191. Each liquid guide groove 1192 connects the corresponding liquid guide groove 1191 to the outlet of the high-pressure hydrogen discharge path 118 (hereinafter referred to as the "discharge path outlet") from which the high-pressure hydrogen comes out. Part of the water flowing through each liquid guide groove 1191 flows into the corresponding liquid guide groove 1192. The water that has flowed into the liquid guide groove 1192 enters the high-pressure hydrogen discharge path 118 through the discharge path outlet, and reaches and moistens the electrolyte membrane 111. As can be seen from the foregoing, the high-pressure hydrogen discharge path 118 is an example of a supply path for supplying water to the electrolyte membrane 111. The discharge path outlet is an example of an inlet of the supply path through which water enters the high-pressure hydrogen discharge path 118.

FIG. 5 illustrates a liquid guide grooves 1192a to 1192c as the liquid guide grooves 1192 of the three stacked cell units 110. The illustrated liquid guide grooves are denoted, in order of proximity to the piston unit 120, as the liquid guide groove 1192a, the liquid guide groove 1192b, and the liquid guide groove 1192c.

The liquid guide groove 1192a, the liquid guide groove 1192b, and the liquid guide groove 1192c are formed at different angles. For example, the liquid guide groove 1192a extends horizontally, whereas the liquid guide groove 1192b and the liquid guide groove 1192c incline downward toward the respective discharge path outlets. Here, an inclination angle with respect to a horizontal plane in the case of the downward inclination toward the discharge path outlet is defined to be positive. The inclination angles of the liquid guide groove 1192b and the liquid guide groove 1192c are larger than that of the liquid guide groove 1192a. However, the inclination angles of the liquid guide grooves 1192 are less than 90 degrees. The inclination angle of the liquid guide groove 1192a is 0 degree. As the inclination angle increases, it becomes easier for water to flow from the liquid guide groove 1191 into the liquid guide groove 1192. The amount of water flowing through the liquid guide grooves 1191 decreases with increase in a distant from the piston unit 120 because part of the water flows into the liquid guide grooves 1192. Therefore, increasing the inclination angles of the liquid guide grooves 1192 in proportion as the distant from the piston unit 120 increases makes it possible to cause uniform amounts of water to flow into the liquid guide grooves 1192. A liquid guide groove 1192 with a negative inclination angle may be provided. However, the inclination angles of the liquid guide grooves 1192 exceed −90 degrees. Referring to two liquid guide grooves 1192 having different inclination angles, one distant from the piston unit 120 is an example of a first groove, and the other close to the piston unit 120 is an example of a second groove. An inlet connected to the first groove is an example of a first inlet. An inlet connected to the second groove is an example of a second inlet.

A comparison between the liquid guide groove 1192b and the liquid guide groove 1192c shows that these liquid guide grooves 1192 have different widths. Accordingly, the liquid guide groove 1192b and the liquid guide groove 1192c have different cross-sectional areas. As the width of the liquid guide groove 1192 increases, it becomes easier for water to flow from the liquid guide groove 1191 into the liquid guide groove 1192. Therefore, increasing the widths of the liquid guide grooves 1192 in proportion as the distant from the piston unit 120 increases makes it possible to cause uniform amounts of water to flow into the liquid guide grooves 1192. With this configuration, the electrolyte membranes 111 in the cell units 110 are moistened uniformly. Further, this configuration allows the cell units 110 to work with uniform reaction efficiency, thereby enabling stable boosting of hydrogen. Referring to two liquid guide grooves 1192 having different cross-sectional areas, one distant from the piston unit 120 is an example of a third groove, and the other close to the piston unit 120 is an example of a fourth groove. An inlet connected to the third groove is an example of a third inlet. An inlet connected to the fourth groove is an example of a fourth inlet.

The liquid guide groove 1191 and the liquid guide groove 1192 are each an example of a guide groove for guiding water into the supply path.

Figure 6:
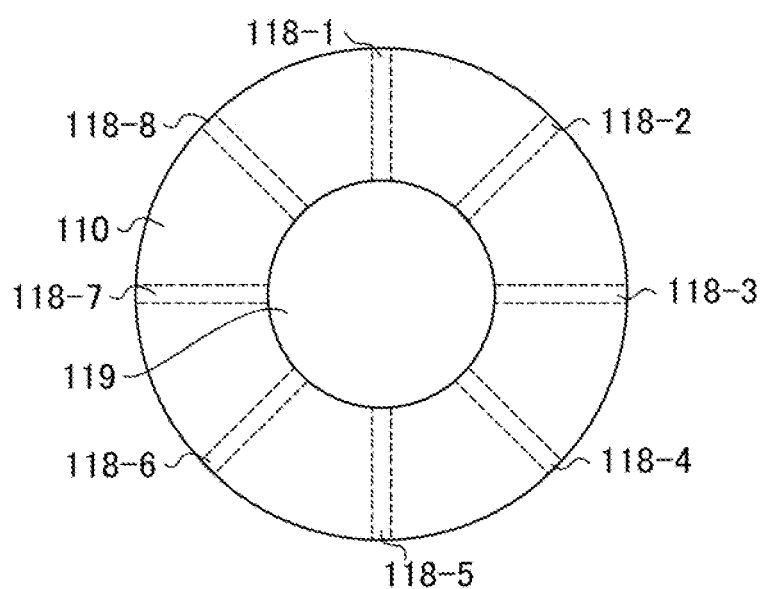
FIG. 6 is a planar view illustrating a central portion extracted from a stack of plurality cell units illustrated in FIG. 1.

As illustrated in FIG. 6, the high-pressure hydrogen discharge paths 118 may extend in different directions. FIG. 6 is a planar view illustrating a central portion extracted from the stack of the plurality of cell units 110. The range illustrated as the central portion in FIG. 6 includes the high-pressure hydrogen flow paths 119 and the wall surfaces of the high-pressure hydrogen flow paths 119. FIG. 6 illustrates, as an example, a state in which eight cell units 110 are stacked. In FIG. 6, the high-pressure hydrogen discharge paths 118, which are located in an inside and are actually invisible, are indicated by hidden lines (dashed lines). FIG. 6 illustrates the eight high-pressure hydrogen discharge paths 118-1 to 118-8. For example, the high-pressure hydrogen discharge paths 118-1, 118-2, 118-3, . . . are consecutively arranged in order of proximity to the piston unit 120. The high-pressure hydrogen discharge path 118-1 is the closest to the piston 120 while the high-pressure hydrogen discharge path 118-8 is the most distant from the piston unit 120. The high-pressure hydrogen discharge paths 118-1 to 118-8 each extend in a direction in which water flows, i.e., in a direction from the respective discharge path outlet toward the electrolyte membrane 111. Horizontal components of the directions of the high-pressure hydrogen discharge paths 118-1 to 118-8 differ from each other. For example, if the direction in which the high-pressure hydrogen discharge path 118-1 extends is defined as the 12 o'clock direction, the direction in which the high-pressure hydrogen discharge path 118-3 extends is the 3 o'clock direction. In other words, the directions in which the high-pressure hydrogen discharge paths 118-1 to 118-8 illustrated in FIG. 6 extend are offset from each other by 45 degrees. The electrochemical hydrogen compressor 100 may have high-pressure hydrogen discharge paths 118 extending in the same direction. The angle between the high-pressure hydrogen discharge paths 118 is not limited to 45 degrees, but may be any other angle.

Any two of the high-pressure hydrogen discharge paths 118-1 to 118-8 are an example of a first supply path and an example of a second supply path, respectively. The direction in which the high-pressure hydrogen discharge path 118 as the first supply path extends toward the electrolyte membrane 111 is an example of a first direction. The direction in which the other high-pressure hydrogen discharge path 118 as the second supply path extends toward the electrolyte membrane 111 is an example of a second direction.

The electrochemical hydrogen compressor 100 of the embodiment includes the liquid drain paths 1223 for draining water in the spring recesses 1221. This feature allows the electrochemical hydrogen compressor 100 of the embodiment to prevent water from accumulating in the spring recesses 1221 in the piston unit 120. The prevention of accumulation of water leads to prevention of corrosion of the Belleville springs 123 and other components.

The electrochemical hydrogen compressor 100 of the embodiment further includes the liquid guide grooves 1191 and the liquid guide grooves 1192 that guide water drained out of the spring recesses 1221 to the high-pressure hydrogen discharge paths 118 leading to the electrolyte membrane 111. This feature makes it easier for the water to flow to the electrolyte membrane 111. Thus, the electrochemical hydrogen compressor 100 of the embodiment can moisten the electrolyte membrane 111 with the water. As a result, the cell units 110 provide an environment suitable for the electrode reaction, and can stably boost hydrogen.

The above embodiment can be modified as follows. In the above embodiment, the example in which water is drained out of the spring recesses has been described. However, a liquid other than water may be drained out of the spring recesses.

The Belleville springs 123 of the piston unit of the embodiment may be replaced with other elastic bodies exerting an elastic force, such as springs of a different type.

In the above embodiment, the apparatus configured to boost hydrogen has been described. However, the electrochemical compressor of the embodiment may be configured as an apparatus that boosts a pressure of a gas other than hydrogen or a pressure of any other fluid. In this case, the configuration of the cell units is determined according to the fluid to be boosted.

The electrochemical compressor of the embodiment may be configured as an apparatus that produces hydrogen by water electrolysis and boosts the produced hydrogen. In this case, the electrochemical compressor supplies water to the cell units. The cell units generate hydrogen by water electrolysis.

The embodiment described above is a mere example, and is not intended to limit the scope of the present disclosure.

The embodiment of the present disclosure can be worked in various ways without deviating from the spirit of the present disclosure.

EXPLANATION OF REFERENCE NUMERALS

100: Electrochemical Hydrogen Compressor
110: Cell Unit
111: Electrolyte Membrane
112a: Cathode-Side Separator
112b: Anode-Side Separator
113a: Cathode-Side Power Feeder
113b: Anode-Side Power Feeder
114a: Cathode-Side Catalyst
114b: Anode-Side Catalyst
115: Normal-Pressure Hydrogen Supply Path
116: Normal-Pressure Hydrogen Flow Path
117: Normal-Pressure Hydrogen Discharge Path
118: High-Pressure Hydrogen Discharge Path
119, 131, 161, 171, 1212, 1222: High-Pressure Hydrogen Flow Path
120: Piston Unit
121: Stationary Member
122: Movable Member
123: Belleville Spring
124: Spring Shaft
125: Ring Member
126a, 126b: Sealing Member
130a: Top Plate
130b: Bottom Plate
140: Tie Rod
150: High-Pressure Hydrogen Outlet
160a, 160b: End Plate
170a, 170b: Insulation Plate
1110a, 1110b: Mark
1191, 1192, 1192a, 1192b, 1192c: Liquid Guide Groove
1211: Recess
1221: Spring Recess
1223: Liquid Drain Path
1224: Liquid Drain Groove
1241: Liquid Drain Hole
P: Power Supply

What is claimed is:

1. An electrochemical compressor comprising:
a housing chamber that houses an elastic body pressing, with an elastic force, an electrochemical cell in which a gas supplied to an anode side of a solid polymer electrolyte membrane as a partition wall is compressed by being moved by electricity to a cathode side opposite to the anode side, the housing chamber being configured to receive part of the gas compressed by the electrochemical cell, the part of the gas flowing into the housing chamber; and
a drain path that allows a liquid in the housing chamber to be drained out of the housing chamber,
wherein an inlet of the drain path is connected to both one side and another side between which a bottom of the elastic body resides.

2. The electrochemical compressor according to claim 1, further comprising:
a guide groove that guides the liquid drained through the drain path to a supply path, the supply path allowing the liquid to be supplied to the solid polymer electrolyte membrane in the electrochemical cell.

3. The electrochemical compressor according to claim 2,
wherein the guide groove comprises a groove extending while inclining downward toward an inlet of the supply path.

4. The electrochemical compressor according to claim 2,
wherein the guide groove comprises a first inlet and a second inlet that is closer to the housing chamber than the first inlet,
wherein the guide groove comprises a first groove extending while inclining downward toward the first inlet, and a second groove extending toward the second inlet, and
wherein when an inclination angle of a groove inclining downward is defined to be positive with respect to a horizontal plane, an inclination angle of the first groove is larger than an inclination angle of the second groove.

5. The electrochemical compressor according to claim 2,
wherein the quide groove comprises a third inlet and a fourth inlet that is closer to the housing chamber than the third inlet,
wherein the guide groove comprises a third groove extending toward the third inlet, and a fourth groove extending toward the fourth inlet, and
wherein the third groove is larger in cross-sectional area than the fourth groove.

6. The electrochemical compressor according to claim 1,
wherein the electrochemical cell comprises a plurality of electrochemical cells,
the electrochemical compressor further comprising:
a first supply path that allows the liquid drained through the drain path to be supplied to a first solid polymer electrolyte membrane in one of the electrochemical cells, the first supply path extending in a first direction toward the first solid polymer electrolyte membrane; and
a second supply path that allows the liquid drained through the drain path to be supplied to a second solid polymer electrolyte membrane in a different one of the electrochemical cells, the second supply path extending in a second direction toward the second solid polymer electrolyte membrane, the second direction being different from the first direction.

7. The electrochemical compressor according to claim 2,
wherein the electrochemical cell comprises a plurality of electrochemical cells,
the electrochemical compressor further comprising: a mark with reference to which the plurality of electrochemical cells are brought into phase alignment.

8. The electrochemical compressor according to claim 6, further comprising:
a mark with reference to which the plurality of electrochemical cells are brought into phase alignment.

9. The electrochemical compressor according to claim 1, further comprising:
a rod-shaped hollow shaft that is fittable into a hole formed in the elastic body,
wherein the rod-shaped hollow shaft has a drain hole penetrating the shaft and connecting an inside to an outside of the shaft.

10. The electrochemical compressor according to claim 1, further comprising:
a drain groove formed on a bottom of the housing chamber and connected to the drain path.

* * * * *